Patented July 1, 1947

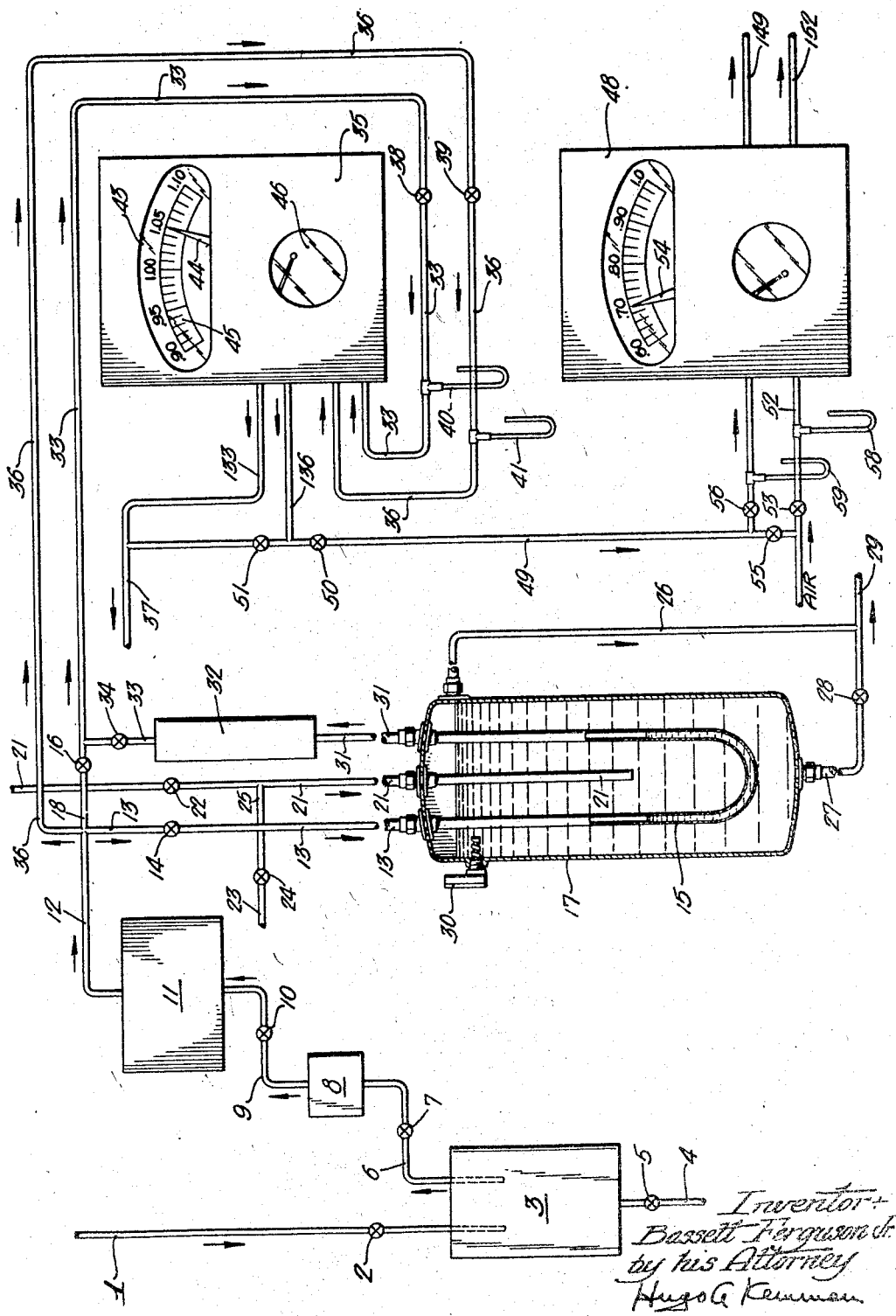

2,423,377

UNITED STATES PATENT OFFICE

2,423,377

DETERMINATION OF DIOLEFINE MATERIAL IN A GASEOUS MIXTURE

Bassett Ferguson, Jr., Media, Pa., assignor to The United Gas Improvement Company, a corporation of Pennsylvania Application October 22, 1942, Serial No. 462,937

7 Claims. (Cl. 23—232)

This invention pertains generally to a method and apparatus for the analysis of materials, and more particularly for determining the quantity of hydrocarbon material, such as, diolefine material present in a mixture containing the same.

Diolefine containing mixtures may be obtained from many different sources. For example diolefines may be found in coal gas, coke oven gas, oil gas, carburetted water gas and other manufactured gases.

I have devised a method and apparatus for determining the proportion of diolefine material present in a mixture containing the same which involves (1) measurement of the density of said mixture, (2) measurement of the density of said mixture after all of the diolefine material has been removed therefrom, and (3) measurement or knowledge of the density of the diolefine material present in the absence of all other material. From these data the percentage of diolefine material present in the original mixture may be determined.

If a single diolefine is present in the original mixture, such as, for example butadiene, isoprene or piperylene, the density thereof may be obtained from a standard handbook, or other source, and is therefore not necessary of measurement.

On the other hand if more than one diolefine is present in the original mixture, the density of the diolefine material in the absence of all other material should be determined, or at least fairly accurately estimated, unless, of course, the percentage of each diolefine present in the diolefine material is known from which the density of the overall diolefine material may be calculated.

In processes for the recovery of diolefine material from mixed gases produced for example in processes for the pyrolytic decomposition of petroleum oil, such as in the manufacture of oil gas or carburetted water gas, a close and frequent check on the efficiency of diolefine removal is highly desirable.

If a single diolefine is present in any such mixture, it is merely necessary for my purposes to make a determination of the density of said mixture before and after all of the diolefine has been removed therefrom, since the density of the single diolefine is already known.

These data furnish a range in density between a gas containing 100% of said diolefine and a gas mixture from which all of said diolefine has been removed, and therefore containing 0% of the same.

From these basic data the diolefine content of any such mixture may be very readily calculated.

By merely taking a density reading on said mixture at any point in its manipulation for diolefine removal where it is desired to know the diolefine content, the diolefine content may be very readily calculated.

This may be illustrated, for example, in the case of the recovery of butadiene from the products produced in the manufacture of oil gas.

Since all other diolefines are of considerably lower vapor pressure, any gas after being subjected to butadiene removal to any substantial degree will contain very little, if any, other diolefine material. Such gas, on the other hand, will contain in addition to butene and whatever butadiene is present, substantial quantities of propylene, ethylene, methane and hydrogen as well as other gases of considerably lower density than butadiene.

Taking the density of air as unity, the density of pure butadiene is approximately 1.86.

A density reading on the gas undergoing analysis (in this case the residual gas) is made after special treatment to remove all of the butadiene therefrom. Let us call this density $X$.

From this we can see that the density range between pure butadiene and the residual gas after the removal of all of the butadiene therefrom is $(1.86-X)$.

If all of the previous conditions remain fixed including the pyrolysis of the petroleum oil, this density range also becomes fixed and need be determined only once.

Then for the purposes of calculating the butadiene content of said gas during any stage of, or after treatment thereof for the removal of butadiene, it is merely necessary to determine the density of said gas at that particular stage.

For purposes of illustration, let us call this density $Y$.

The per cent of butadine by volume in said gas at any such stage may be calculated from the following formula:

$$\frac{Y-X}{1.86-X} \times 100 = \% \text{ butadiene}$$

The assumption that the density of the gas is constant after the removal of all butadiene therefrom is valid only if the composition of this gas remains constant. Variations in the manufacturing and/or purifying operations will cause the composition of the gas to vary.

To overcome these difficulties, I have invented a process and apparatus for the accurate quantitative determination of the diolefine content of mixed gases which eliminates for practicable purposes possible inaccuracies due to swings in composition of said mixed gases.

This new method and apparatus may be conveniently described in connection with the accompanying drawing in which the figure diagrammatically illustrates apparatus for carrying out my invention.

In the figure, 1 is a gas line or conduit through which the gas mixture flows through valve 2 into an enclosure 3 for trapping out any liquid in the form of mist or otherwise, any such liquid being drained off through line 4 controlled by valve 5 as desired.

The mixed gases, freed of entrained liquid, flow through gas line 6 controlled by valve 7 into and through a pressure regulating valve 8 which may be conveniently of the diaphragm type, and which may be employed, if desired, for the regulation of pressure of the inflowing gases.

The gases flow through gas line 9 controlled by valve 10 into and through a drier 11, which may be of any suitable type for the removal of moisture from the mixed gases. Dehydrated calcium chloride is an example of a suitable drying material.

The gases then flow through gas line 12 and divide, a part flowing through gas line 13 leading to a reaction chamber 15 which is conveniently illustrated as a U-tube, and a part flowing through gas line 36 to be referred to hereinafter.

Reaction chamber 15 contains a suitable reagent for the removal of diolefine material from the mixed gases and may be, for example, maleic anhydride.

When such reagent is solid at room temperatures such as is the case with maleic anhydride, and it is desired to maintain the same liquid, or when it is desired to operate at an elevated or reduced temperature, reaction chamber 15 may be enclosed in a suitable temperature control jacket such as that illustrated at 17, or may be provided with any other suitable temperature control means. For example a wrapping of electrical resistance wire or a gas burner may be employed for elevated temperature purposes, or a cooling coil or brine may be employed for reduced temperature purposes.

As illustrated, jacket 17 is provided with a steam line 21 controlled by valve 22 for the inlet of steam into jacket 17 for the control of the temperature of water contained therein. If desired, steam inlet line 21 may be provided with an inlet illustrated at 25 and connected to line 23 controlled by valve 24 for the inlet of water or other fluid for the control of the temperature of the steam or for filling jacket 17 or otherwise.

As illustrated, jacket 17 is provided with a liquid overflow 26 and a drain 27 controlled by valve 28, both leading to drain pipe 29.

A thermometer is illustrated at 30 for indicating the temperature of the water in jacket 17.

Any other arrangement might be substituted for maintaining the reaction chamber 15 at an elevated temperature, or at any other temperature as required or desired for the proper reaction of the particular reagent therein with the diolefine material in the mixed gases for the removal of said diolefine material therefrom. When maleic anhydride is the reagent, the reaction temperature may be suitably between 90° C. and 120° C. such as for example between 90° C. and 100° C.

The gas stripped of diolefine material flows from reaction chamber 15 through gas line 31 into reagent extractor 32 for the extraction of any reagent carried along with said gas.

When maleic anhydride is the reagent, extractor 32 may comprise merely an enclosure containing steel wool at room temperature upon which any maleic anhydride carried along with the gases condenses.

The gas (stripped of both diolefine material and reagent) flows from reagent extractor 32 through gas line 33.

It will be noted that gas lines 13 and 33 are connected through gas line 18 controlled by valve 16, and that gas line 33 is provided with valve 34 between its connection with gas line 18 and reagent extractor 32, the purpose of which will be hereinafter described.

Gas lines 33 and 36 lead to a relative gas density register shown diagrammatically at 35.

Relative gas density register 35 may be of a type well known in the art, and registers on the dial 43 by means of an indicator 44 moving over a properly calibrated chart 45, relative density between the gases flowing into register 35 through gas line 33 and gas line 36, the indicator 44 changing in position with any change in said relative density.

A relative gas density register suitable for my purposes is commercially known by the trade name "Ranarex." Incidentally this particular register is also provided with a recorder indicated generally at 46.

The construction and operation of relative gas density registers are well known in the art, and therefore will not be particularly described.

These relative gas density registers usually require somewhat comparable inlet pressures on the two gas streams and for this purpose, I have provided control valves 38 and 39 and manometers 40 and 41 in gas lines 33 and 36, respectively. The flow of gas in line 33 is controlled by valve 38, and the flow of gas in line 36 is controlled by control valve 39. Valves 38 and 39 are preferably so adjusted as to cause manometers 40 and 41 to register somewhat comparable pressures. This pressure may, for example, be between 1 and 2 inches of water.

Gas flowing into register 35 through gas line 33 leaves register 35 through gas line 133, and gas flowing into register 35 through line 36 leaves register 35 through line 136. Lines 133 and 136 may converge into line 37 which may lead to any desired point or one of said gas streams may be conducted to a duplicate relative gas density register for the measurement of its density with respect to air or any other suitable reference gas. This will be referred to hereinafter.

In the practice of my invention gas to be analyzed, for example, as to diolefine content such as, for example, a gas which has been subjected to butadiene removal operations, is lead through liquid trap 3, pressure regulator 8 and drying chamber 11, all of which may or may not be necessary or desired depending upon the amount of mist and moisture present in the gas and the gas pressure. It is to be noted that as far as register 35 is concerned, the gas inlet pressures are controlled by valves 38 and 39. The function of pressure regulator 8 therefore, may be merely to reduce the pressure on the inlet gas stream sufficiently to make it more feasible to avoid gas leaks between pressure regulator 8 and valves 38 and 39, or to avoid any possible condensation of gas in the equipment, or both, or otherwise.

The gas now enters gas line 12 and divides into two streams, one of which retains its previous diolefine content and the other of which is stripped of its diolefine content and then has a different density. The two streams then pass through register 35 and relative density is read on chart 45.

Chart 45 may be calibrated and indicator 44 may be adjusted so as to register on chart 45 in any desired manner, as will be readily understood by persons skilled in the use of registering instruments.

A calibrated chart furnished with the relative gas density indicator "Ranarex" is provided with a center point bearing the numeral 1 which indicates no difference in density between the two gas streams.

In the normal use of this device the reference gas is air which has a density of 1, and the chart is calibrated so that the density, with respect to air, of the gas being tested may be read directly.

In my use of this device either gas stream may be used as the reference gas. The density of either gas stream (with respect to air or any other reference gas) should be known, or be capable of fairly accurate estimation, or else it should be measured.

It is convenient to use the diolefine free gas stream as the reference gas, since it is usually of lesser density than the diolefine containing gas. In this case indicator 44 will register above 1, and will show the relative density of the gas stream undergoing test with respect to the gas stream from which all the diolefine material has been removed.

Should the diolefine containing gas stream be used as the reference gas, indicator 44 will register below 1, and will show the relative density of the diolefine free gas stream with respect to the diolefine containing gas stream.

It will, of course, be understood that should the gas undergoing test contain no diolefine material, indicator 44 will register on 1, for then the two gas streams will be of the same density.

Assuming for purposes of illustration that the diolefine-free gas stream is employed as the reference gas, the density of either gas stream with respect to air should be either known or be capable of fairly accurate estimation, or else it should be measured.

If such density is capable of some change during the course of operations, as is usually the case, I prefer to duplicate register 35 for the purpose of measuring the density of either of said streams with respect to air (or some other reference gas).

Such duplicate register is indicated generally at 48. Gas line 49 leading to register 48 is connected to line 136 through valve 50, and line 136 is provided with valve 51.

By closing valve 51 and opening valve 50 the diolefine containing gas stream is made to flow through line 49, and valve 56 into register 48 which registers its density with respect to air flowing into register 48 through gas line 52 controlled by valve 53. The pressures of the two streams are regulated by valves 53 and 56 and observed on manometers, 58 and 59 respectively.

The diolefine containing gas stream leaves register 48 through line 149, and the air stream through line 152.

*Example 1*

Let us assume for purposes of illustration that a gas is to be measured for butadiene content. Let us assume further that the butadiene-free gas is employed as the reference gas and that indicator 44 of register 35 registers on 1.05 to show the relative density of the butadiene-containing gas with respect to the butadiene-free gas.

Let us also assume that indicator 54 of register 48 registers on .70 to show the density of the butadiene-containing gas with respect to air.

The density of the butadiene-free gas then becomes $$\frac{.70}{1.05} = .667$$

because the butadiene containing gas which has a density of .70 as shown by register 48 is 1.05 as dense as the butadiene-free gas as shown by register 35.

Then substituting in the above formula $$\frac{.70 - .667}{1.86 - .667} \times 100 = 2.77 = \% \text{ of butadiene in the gas under test}$$

For a gas containing any other diolefine, or a mixture of diolefines, particularly when of similar vapor pressure, the appropriate density is substituted for the density of butadiene (1.86) in the above formula.

To adjust indicator 44 to read on numeral 1 (or on any other selected point) when the two gas streams are of the same gas density, valves 14, 16 and 34 and gas line 18 are provided. To effect this adjustment, valves 14 and 34 are closed and valve 16 is opened, whereupon the two gas streams flowing through the indicator 35 will be of the same density, and indicator 44 may be accordingly adjusted.

In normal use, valve 16 is closed and valves 14 and 34 are open.

Indicator 54 may be similarly adjusted by opening valve 55 and closing valve 50. Normally valve 55 is closed.

In the case of the commercial register, chart 45 is calibrated so that indicator 44 registers the ratio of density of the gas flowing through gas line 36 relative to the density of the gas flowing through gas line 33, using the decimal system. To illustrate, it may indicate that the gas flowing through line 36 is 1.05 as dense as the gas flowing through line 33, as was the case in the above example.

If the gas streams entering register 35 are transposed, the diolefine-containing gas becomes the reference gas and indicator 44 will register below 1 as will be obvious.

For purposes of calculation it is merely necessary (1) to know the density of the diolefine material per se; (2) to know the density of the gas undergoing test; and (3) to know the density of the test gas when free of all diolefine material.

As will be seen from the above description, the density of either (2) or (3) preceding may be expressed in terms of its ratio to the other.

Other methods of calculation than the one illustrated above may be employed.

For example if we let $X = \%$ butadiene
$Y =$ density of diene-free gas and
$.70 =$ density of gas undergoing test then $$1.86X + (100 - X)Y = .70 \times 100$$

in which, if indicator 44 registers on 1.05 as was assumed in the above example, then $$Y = \frac{.70}{1.05} = .667$$

whereupon X equals 2.77% butadiene.

The reagent in reaction chamber 15 may be renewed continuously, continually or intermittently as desired or required, any suitable structure or apparatus for this purpose being provided.

As illustrated the reagent may be replaced in reaction chamber 15 by closing valves 14 and 34 and then detaching chamber 15 for the purpose.

While as described the gas stream which it is desired to be free from diolefine material for density measurement purposes is chemically treated to remove diolefine material, it is to be understood that any other means may be employed to effect this purpose either completely or to a practicable extent to realize in whole or in part the advantages of my invention.

For example, this gas stream might be subjected to fractional distillation, particularly if capable of effecting a relatively sharp separation between the diolefine material and the other material present.

Then too, the diolefine material might be separated from this gas stream by selective adsorption, for example, on activated carbon, or by selective absorption, such as in a suitable wash liquid, or by the use of a monovalent salt of groups 1B and 2B of the periodic system in solution, slurry and/or solid form. It is possible that in many cases fractional crystallization might be resorted to to remove the diolefine material from this gas stream.

Other variations will suggest themselves to persons skilled in the art upon becoming familiar with this invention.

In the invention as more particularly described, the densities measured are gas densities, although it is conceivable that liquid phase densities might be substituted using any suitable reference liquid, for example, water as having a density of 1 or of any other suitable reference value.

The invention is particularly adapted to the analysis of gas mixtures employing gas phase densities. In the case of materials which are or have a tendency to become liquid at room temperatures, suitable means may be provided for carrying out my process at a suitable elevated temperature which preferably for purposes of simplicity in calculation is the same for each of the gas streams.

Broadly speaking the invention may be applied to the quantitative determination of materials other than diolefine materials employing the basic principles of my invention. The determination of my three basic densities on any such material will provide data from which quantitative values may be calculated.

It will, of course, be understood that indicator 44 and/or 54 or any part of the mechanism actuating these indicators may be employed to actuate or control any other means or device.

For example, indicator 44 and/or 54 or any part of its or their actuating mechanism may be employed to control an electrical circuit for sounding alarms, for controlling valves and/or for any other purposes, many of which will suggest themselves to persons skilled in the art upon becoming familiar with this invention.

Having particularly described my invention, it is to be understood that this is by way of illustration and that changes, omissions, additions, substitutions and/or modifications may be made within the scope of the claims without departing from the spirit of the invention.

I claim:

1. In a method of determining the proportion of diolefine material present in a gas mixture, the relative density of which diolefine material with respect to a reference gas being known at least approximately and which is present in said gas mixture together with a substantial quantity of other material including other hydrocarbon material of a density substantially different from that of said diolefine material, the steps comprising dividing said mixture into two streams, passing one stream through a relative density measuring means, selectively removing said diolefine material from the other stream, thereafter passing said other stream through said relative density measuring means to obtain the relative density of one gas stream referred to that of the other, and passing one of said streams through a second relative density measuring means and measuring its density with respect to said reference gas, so that said determined densities together with the known density of said diolefine material may be employed in calculations to obtain the proportional content of diolefine material in said first named mixture.

2. In a method of determining the proportion of diolefine material present in a mixture, said diolefine material having a density which is known at least approximately and which is present in said mixture together with other hydrocarbon material of a density substantially different from said diolefine material, said mixture having a determinable density; the steps comprising dividing said mixture into two streams, passing one stream in the gas phase through a relative density measuring means, selectively removing said diolefine material from the other stream by passing said other stream through a body of material adapted to selectively remove said diolefine material, thereafter passing the remainder of said other stream in the gas phase through said relative density measuring means to determine the ratio of the density of said one stream to that of the remainder of said other stream, and measuring the density of said remainder of said other stream, so that said known and determined densities and said ratio may be employed in calculations to determine the concentration of said diolefine material in said original mixture.

3. In a method of determining the proportion of butadiene present in a mixture containing the same together with a substantial proportion of material including hydrocarbon material other than butadiene of a density substantially different from butadiene, said mixture having a determinable density; the steps comprising dividing the mixture into two streams, passing one stream in the gas phase through a relative density measuring means at a relatively low pressure, selectively removing the butadiene from the other stream and thereafter passing the remainder of said other stream in the gas phase through said relative density measuring means at a pressure comparable to said relatively low pressure to obtain the relative density of the two streams, and measuring the density of one of said streams, so that the determined densities together with the density of butadiene may be employed in calculations to determine the butadiene content of the original mixture.

4. In a method of determining the proportion of butadiene present in mixed gases remaining after the removal by condensation of heavier hydrocarbons and butadiene from products of pyrolysis of petroleum oil, said mixed gases containing a relatively small amount of butadiene and containing a substantial quantity of material including hydrocarbon material other than butadiene of a density substantially different from butadiene, the steps comprising dividing said mixed gases into two streams, passing one stream through a relative density measuring means at a pressure of about 1 to 2 inches of water, selectively removing butadiene from the other stream by passing said other stream through maleic anhydride maintained at a temperature of about 90° C. to 120° C., and passing the remaining mixed gases of said other stream into said relative density measuring means at a pressure comparable to 1 to 2 inches of water to obtain the ratio of the density of the original mixed gases to that of the density of the butadiene-free mixed gases.

5. In the control of operations for the removal of butadiene from gaseous products containing the same and containing other vapor phase material normally found in gaseous products which are treated for the removal of butadiene, the steps which comprise continuously passing residual gas remaining after operations for butadiene removal through a relative density measuring and indicating means adapted to continuously measure and indicate the density of a gas passed therethrough relative to the density of a second gas simultaneously passed therethrough, simultaneously and continuously passing through said relative density measuring and indicating means as said second gas a stream of said residual gas after contact with maleic anhydride under conditions such as to cause the selective removal therefrom of substantially all butadiene contained therein, so that the continuously indicated relative density obtained may be employed in the determination of the instantaneous proportions of butadiene escaping removal from said gaseous products in said operations for butadiene removal therefrom.

6. In the control of operations for the removal of butadiene from gaseous products containing the same and containing other vapor phase material normally found in gaseous products which are treated for the removal of butadiene, the steps which comprise continuously passing a stream of residual gas remaining after operations for butadiene removal through a relative density measuring and indicating means adapted to continuously measure and indicate the density of said gas passed therethrough relative to the density of a second gas simultaneously passed therethrough, simultaneously and continuously passing through said relative density measuring and indicating means as said second gas a stream of said residual gas after contact with maleic anhydride under conditions such as to cause the selective removal therefrom of substantially all butadiene contained therein, after passage through said relative density measuring and indicating means continuously passing one of said gas streams through a second and similar relative density measuring and indicating means, and simultaneously and continuously passing through said second and similar relative density measuring and indicating means a reference gas of known and substantially constant density to obtain a continuous indication of the instantaneous densities of said last mentioned gas stream, so that said last mentioned indicated densities and the indications of relative density obtained from said first mentioned relative density measuring and indicating means may be employed in determining the concentration of butadiene in said first-mentioned residual gas.

7. In the determination of the proportion of diolefine material present in mixed gases containing the same and also containing a considerable proportion of other material of a density different from the density of said diolefine material, the steps comprising substantially completely and selectively removing said diolefine material from a portion of said mixed gases, and determining the ratio of the density of said portion after said treatment to the density of said mixed gases from which said portion was taken so that said ratio may be employed in calculations to determine the diolefine content of said original mixed gases.

BASSETT FERGUSON, JR.

REFERENCES CITED

The following references are of record in the file of this patent:

UNITED STATES PATENTS

| Number | Name | Date |
|---|---|---|
| 2,036,251 | Boynton | Apr. 7, 1936 |
| 2,168,236 | Pick | Aug. 1, 1939 |
| 2,232,435 | Burk | Feb. 18, 1941 |
| 2,244,366 | Jacobson et al. | June 3, 1941 |
| 2,263,335 | Heinz | Nov. 18, 1941 |

OTHER REFERENCES

Karrer, Organic Chemistry (1938), p. 55.
Perry's Chemical Engineer's Handbook, p. 2071 (1941).